(12) United States Patent
Richard

(10) Patent No.: US 6,380,864 B1
(45) Date of Patent: Apr. 30, 2002

(54) INDICATING DISPLAY FOR A MOTOR VEHICLE, IN PARTICULAR A RAISED STOP LIGHT UNIT

(75) Inventor: Hervé Richard, Toulouse (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 08/766,230

(22) Filed: Dec. 12, 1996

(30) Foreign Application Priority Data

Dec. 15, 1995 (FR) .......................................... 95 14909

(51) Int. Cl.⁷ ................................................. G08B 5/22
(52) U.S. Cl. ............. 340/815.45; 340/461; 340/815.76; 362/240; 362/300; 362/555
(58) Field of Search ....................... 340/815.45, 815.56, 340/815.76, 464, 467, 463, 461, 525, 980; 345/7; 359/853, 858, 860; 362/300, 61

(56) References Cited

U.S. PATENT DOCUMENTS

| | | | | |
|---|---|---|---|---|
| 3,710,095 A | * | 1/1973 | Donohue et al. | 362/348 |
| 3,848,974 A | * | 11/1974 | Hosking et al. | 345/7 |
| 3,849,642 A | * | 11/1974 | Puyplat | 240/41.3 |
| 4,075,471 A | * | 2/1978 | Jones | 362/300 |
| 4,211,955 A | | 7/1980 | Ray | 315/53 |
| 4,271,408 A | * | 6/1981 | Teshima et al. | 340/815.56 |
| 4,456,948 A | * | 6/1984 | Brun | 362/268 |
| 4,477,160 A | * | 10/1984 | Trumbull | 352/40 |
| 4,972,303 A | | 11/1990 | Machida et al. | 362/80 |
| 5,047,747 A | * | 9/1991 | Gottlieb | 340/763 |
| 5,089,805 A | * | 2/1992 | Salsman | 340/464 |
| 5,101,193 A | | 3/1992 | Smith et al. | 340/479 |
| 5,148,146 A | * | 9/1992 | Murphy | 340/461 |
| 5,287,101 A | * | 2/1994 | Serizawa | 340/815.76 |
| 5,471,371 A | * | 11/1995 | Koppolu et al. | 362/555 |
| 5,475,512 A | * | 12/1995 | Nakazawa et al. | 359/13 |
| 5,624,176 A | * | 4/1997 | O'Farrell et al. | 340/463 |
| 5,765,940 A | * | 6/1998 | Levy et al. | 362/240 |

FOREIGN PATENT DOCUMENTS

| | | |
|---|---|---|
| DE | 41 29 094 | 3/1903 |
| DE | 32 39 754 | 5/1984 |
| DE | 40 03 569 | 2/1990 |
| DE | 40 02 520 | 8/1990 |
| DE | 91 14 246 | 2/1992 |
| DE | 44 11 440 | 10/1994 |
| EP | 0 650 865 | 5/1992 |
| EP | 0 495 685 | 7/1992 |
| GB | 2 261 497 | 5/1993 |

OTHER PUBLICATIONS

Patent Abstracts of Japan 61–193738, Feb. 10, 1985; 07002014, Jun. 17, 1993.
French Search Report dated Aug. 9, 1996.

* cited by examiner

*Primary Examiner*—Edward Lefkowitz
*Assistant Examiner*—Davetta W. Goins
(74) *Attorney, Agent, or Firm*—Morgan & Finnegan, LLP

(57) ABSTRACT

An indicating display for a motor vehicle, for example a raised stop light unit, includes a plurality of aligned light sources, optical means for concentrating the luminous flux emitted by the light sources in a general emission direction, and a lens which is provided with optical means for diffusing the light. The optical concentrating means consist of a parabolic mirror which is bounded by two planes both of which lie on the same side of its optical axis, and which are in line with the lens, while the light sources are offset vertically from the lens.

20 Claims, 1 Drawing Sheet

INDICATING DISPLAY FOR A MOTOR VEHICLE, IN PARTICULAR A RAISED STOP LIGHT UNIT

FIELD OF THE INVENTION

The present invention relates in general terms to indicating displays for motor vehicles, and more particularly to an indicating display which is equipped with a plurality of light sources which are aligned with each other, and all of which take part in a common indicating function.

BACKGROUND OF THE INVENTION

An indicating display of the above general type, known in the current state of the art, comprises for example a plurality of light emitting diodes. This may for example consist of a raised stop lamp for fitting in a rear window or in a rearwardly facing part of a motor vehicle.

In order that such a display shall satisfy the photometric requirements imposed by current regulations, it includes, arranged in line with the light emitting diodes, an intermediate screen which is provided with Fresnel lenses, each of which is associated with a corresponding one of the diodes in order to concentrate the light in the axis of the vehicle, and a lens which receives light from the intermediate screen and which is provided with contoured elements for the horizontal and vertical distribution of the light. One drawback of this known solution lies in the fact that, because of the presence of the light sources, the intermediate screen and the lens, arranged one after another in a straight path, the indicating light unit has a substantial length in the direction of the optical axis.

This disadvantage is even more inconvenient in the case of raised stop lights which are fitted within the cabin of the vehicle. For a unit fitted in such a position, it is desirable that its size should be as small as possible.

DISCUSSION OF THE INVENTION

A main object of the present invention is therefore to provide an indicating display having a shortened axial length.

According to the invention, an indicating display for a motor vehicle, of the type comprising a plurality of light sources aligned with each other, optical means for concentrating the light flux emitted by the sources into a general emission direction, and a lens which is provided with optical means for diffusing the light, is characterised in that the optical concentrating means consist of a mirror having a parabolic cross section delimited by two planes, both of which lie on the same side of its optical axis, and which extend in line with the lens, and in that the light sources are offset vertically with respect to the lens.

According to a preferred feature of the invention, the mirror is defined by a part of the housing.

Preferably, the light sources are situated substantially below the lens, in a cavity which is delimited by portions of the housing which extend the latter downwardly.

According to another preferred feature of the invention, the mirror consists of a plurality of portions of paraboloids of revolution, the foci of which lie substantially on the corresponding respective light sources.

Preferably, the light sources are light emitting diodes.

According to a further preferred feature of the invention, the housing includes two extensions having unequal lengths and extending from the upper and lower edges of the lens, the said extensions receiving at their free end a smooth transparent inclined cover plate.

Preferably, the light sources are oriented generally in a direction opposed to the exit direction of the light from the indicating display.

Further features, objects and advantages of the present invention will appear more clearly on a reading of the following detailed description of a preferred embodiment of the invention, which is given by way of example and with reference to the accompanying drawings.

DESCRIPTION OF A PREFERRED EMBODIMENT OF THE INVENTION

Figure 1:
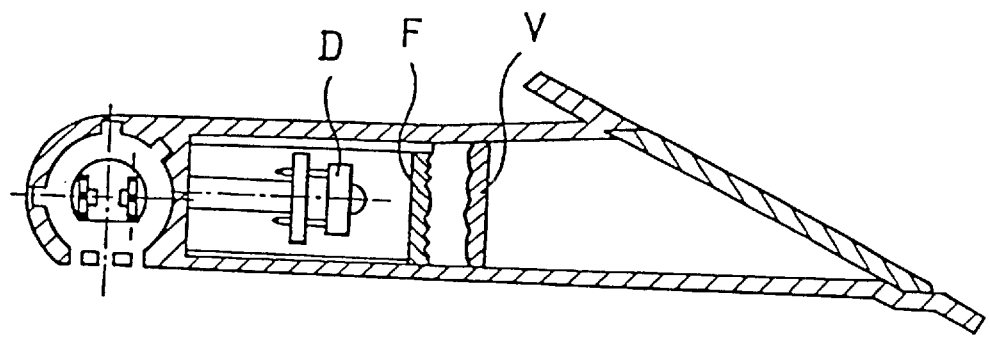
FIG. 1 is an elevation in cross section of a raised stop light of the prior art, for the rear window of a motor vehicle.
Figure 2:
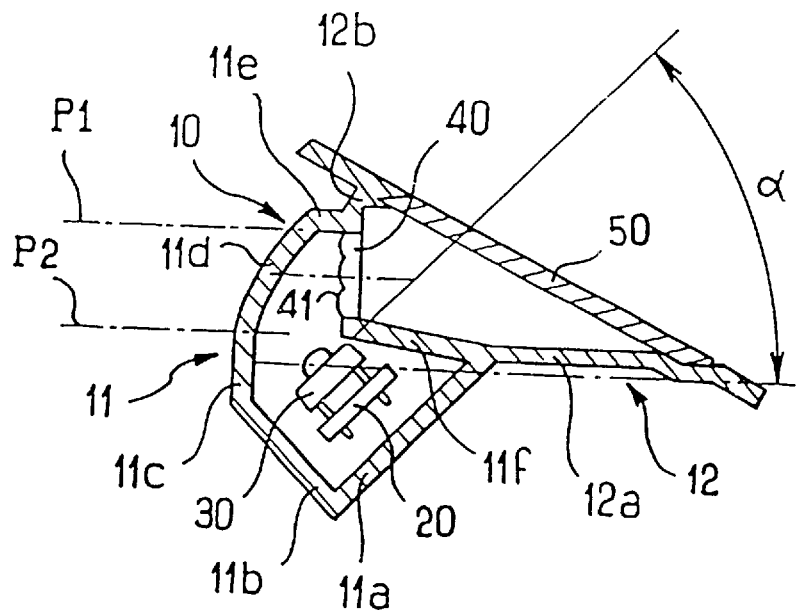
FIG. 2 is an elevation in vertical axial cross section of an indicating display in accordance with the present invention.

Before reference is made to FIG. 2 showing the preferred embodiment of the invention, reference is briefly made to the prior art indicating display, in the form of a raised stop light, which is shown in FIG. 1. This includes a row of light emitting diodes D. In front of the light emitting diodes D, an intermediate screen F, having Fresnel lenses each of which is associated with a respective one of the diodes D, is mounted within the housing of the raised stop light unit. The purpose of the intermediate screen F is to concentrate the light along the axis of the vehicle. In front of the screen F, is a lens V which includes elements for the horizontal and vertical distribution of the light. The unit shown in FIG. 1 is an example of the units described above under the heading "Background of the Invention".

Reference is now made to FIG. 2, which shows an indicating display which in this example is a raised stop lamp adapted to be fitted in an opening in the bodywork of the motor vehicle, so as to be visible from behind the vehicle.

The raised stop lamp unit shown in FIG. 2 comprises: a housing generally indicated by the reference numeral 10; a printed circuit 20 which is mounted within the housing, and which supports a set of light emitting diodes 30; a lens 40; and a transparent external cover plate 50.

The housing 10 comprises a first part 11 which is closed by the lens 40 and which encloses the printed circuit 20 and the light emitting diodes 30. This part 11 has two oblique base walls 11a and 11b, which define a right angle between them. The part 11 also includes a posterior wall 11c, together with a further wall 11d. The posterior wall 11c is essentially vertical, and extends the oblique base wall 11b upwards.

The internal surface of the wall 11d consists of a plurality of portions in the form of a paraboloids of revolution, the foci of which are spaced apart at regular intervals on a line which lies at a level lower than the wall 11d. In this example, this line lies at approximately the same height as the other end of the oblique base wall 11a, this level intersecting the middle of the posterior wall 11c. At least the wall 11d of the housing part 11a is provided with an internal reflective coating, which is formed for example by vacumetallisation.

The part 11 of the housing also has another wall 11e which extends forwards (i.e. towards the right in FIG. 2) from the upper end of the wall 11d, and a further wall 11f which extends rearwardly from the upper end of the wall 11e.

The lens 40 is formed on its inner face with balls, toroids or spheres 41 for diffusing the light. It is mounted generally vertically in the aperture which is defined between the front end of the wall 11e and the rear end of the wall 11f, and is secured in position by adhesive bonding or ultrasonic welding, for example.

The printed circuit 20 is mounted in the cavity defined by the housing part 11. The printed circuit is of elongate form and follows the line of the foci of the parabolic reflective portions, or mirrors, that constitute the housing wall 11d. The printed circuit 20 is oriented obliquely, essentially parallel with the base wall 11a, in a plane which defines an angle α with the general direction of emission of light by the stop lamp unit, this direction being generally horizontal.

The light emitting diodes 30 are of any suitable standard kind, and they are soldered on the printed circuit 20. Each light emitting diode emits light at the level of the focus of one of the respective parabolic mirrors of the wall 11d, mainly towards the said mirror. In this way, a substantial proportion of the light emitted by the light emitting diodes 30 is directed towards their respective mirrors 11d. These mirrors concentrate the light through the lens 40, which provides the diffusion which is necessary in order to satisfy the regulation photometric grid.

The various parameters which play a part in the design of the mirror, namely its upper and lower overall dimensions, and, most particularly, the focal length of each parabolic portion, are defined in particular by the available depth and by the distance between each light source and the next.

It will be observed here that the light emitting diodes 30 lie substantially below the lens 40, and that the limiting planes P1 and P2 of the housing portion which defines the mirror 11d, both lie above the line which passes through the light emitting diodes 30. It will also be observed that the diodes 30 are oriented in a direction which is generally opposed to the exit direction of the light.

The housing 10 of the stop light unit also includes a second part 12 which defines a visor that provides the transition with an inclined opening in the bodywork of the vehicle (not shown), and which also provides the necessary optical seal. The housing part 12 has a first wall 12a which is generally horizontal and which extends the wall 11f of the first housing part 11 outwardly, together with a second wall 12b which is substantially shorter than the wall 12a. The second wall 12b also extends outwardly, in this case from the wall 11e of the housing part 11. The protective transparent cover plate 50 is fitted between the free edges of the two walls 12a and 12b.

By virtue of the use of mirrors of the parabolic type which form part of the housing of the unit, and by virtue also of the disposition of the light emitting diodes 30, the resulting stop light unit is extremely compact in length, without its selling cost being increased by any significant amount.

Although a mirror has been described above which consists of a plurality of portions of paraboloids of revolution, it will of course be understood that other embodiments could be envisaged for the mirror. In particular, it may consist of a parabolic cylinder, the focal line of which passes through the various light sources, or through surfaces which have a profile that may for example be defined mathematically, being such as to provide all the required light distribution upstream of the lens 40.

In another embodiment, the invention may be applied to a raised stop light for an inclined rear window.

What is claimed is:

1. A vehicle indicating display comprising:
   a plurality of aligned light sources for emitting a luminous flux;
   optical means, in the path of said luminous flux, for concentrating said luminous flux into a general emission direction; and
   a lens, interposed in said general emission direction, for diffusing the light,
   wherein said optical means comprises a mirror having a parabolic cross section and defining an optical axis of the mirror, the mirror further defining, and being delimited by two planes both of which lie on the same side of the optical axis and extend in line with the lens, the light sources being offset vertically from the lens.

2. The indicating display according to claim 1, being a unit comprising a housing which includes a housing portion that defines the mirror, the light sources and the lens being contained within the housing.

3. The indicating display according to claim 2, wherein the housing includes housing portions which project downwardly from the remainder of the housing and which define a cavity, the light sources being disposed within the cavity substantially below the lens.

4. The indicating display according to claim 1, wherein the mirror comprises a plurality of portions each defining a paraboloid of revolution with a focus lying substantially on a corresponding one of the light sources.

5. The indicating display according to claim 1, wherein the light sources comprise emitting diodes.

6. The indicating display according to claim 1, being a unit comprising a housing which includes a housing portion that defines the mirror, the light sources and the lens being contained within the housing,
   wherein the indicating display is an elevated stop light unit for a vehicle rear window, the lens having an upper edge and a lower edge, the housing including two extensions of unequal length extending from the upper and lower edges of the lens respectively, each extension having a free end, the unit further including a smooth, inclined, transparent cover plate fitted between the free ends of the extensions.

7. The indicating display according to claim 1, defining an exit direction for the light from the display, the light sources being generally oriented in a direction away from the exit direction.

8. A stop light unit for a vehicle, comprising the indicating display of claim 1.

9. A vehicle including the indicating display of claim 1.

10. The indicating display according to claim 1, further comprising a housing containing the plurality of aligned light sources, the mirror and the lens.

11. The indicating display according to claim 10, wherein the housing includes housing portions which project downwardly from the remainder of the housing and which define a cavity, the light sources being disposed within the cavity substantially below the lens.

12. The indicating display according to claim 10, further comprising a transparent cover plate, wherein the lens has an upper edge and a lower edge, the housing including two extensions of unequal length extending from the upper and lower edges of the lens respectively, each extension having a free end, the transparent cover plate being adapted to fit between the free ends of the extensions.

13. The indicating display according to claim 1, wherein the mirror comprises a portion of the housing.

14. An indicating display for a vehicle, comprising:
   a plurality of light sources for emitting a luminous flux;
   means, arranged in a path of said luminous flux, for concentrating said luminous flux in a general emission direction; and
   means, interposed in said general emission direction, for diffusing said concentrated luminous flux,
   wherein said means for concentrating comprises a mirror having a parabolic cross section and defining an optical axis of the mirror, the mirror further defining, and being delimited by, two planes both of which lie on the same side of the optical axis and extend in line with the lens, the light sources being offset vertically from said means for diffusing.

15. The indicating display according to claim 1, wherein the light sources are aligned along a direction generally perpendicular to the general emission direction.

16. The indicating display according to claim 1, wherein the light sources, mirror and lens are arranged successive order.

17. The indicating display according to claim 1, wherein the indicating display is a stop light unit.

18. The indicating display according to claim 14, wherein the light sources are aligned along a direction generally perpendicular to the general emission direction.

19. The indicating display according to claim 14, wherein the light sources, mirror and lens are arranged successive order.

20. The indicating display according to claim 14, wherein the indicating display is a stop light unit.

* * * * *